US012561605B2

(12) United States Patent
Sethi et al.

(10) Patent No.: US 12,561,605 B2
(45) Date of Patent: Feb. 24, 2026

(54) USER INTERFACE MANAGEMENT FRAMEWORK

(71) Applicant: Dell Products L.P., Round Rock, TX (US)

(72) Inventors: Parminder Singh Sethi, Ludhiana (IN); Anannya Chowdhury, Jamshedpur (IN)

(73) Assignee: Dell Products L.P., Round Rock, TX (US)

( * ) Notice: Subject to any disclaimer, the term of this patent is extended or adjusted under 35 U.S.C. 154(b) by 1082 days.

(21) Appl. No.: 17/395,651

(22) Filed: Aug. 6, 2021

(65) Prior Publication Data

US 2023/0041350 A1 Feb. 9, 2023

(51) Int. Cl.
*G06N 20/00* (2019.01)

(52) U.S. Cl.
CPC ..................................... *G06N 20/00* (2019.01)

(58) Field of Classification Search
CPC ..................................................... G06N 20/00
USPC ............................................................ 706/11
See application file for complete search history.

(56) References Cited

U.S. PATENT DOCUMENTS 10,949,337 B1 * 3/2021 Yalla ....................... G06N 20/00
2019/0196950 A1 * 6/2019 Ranganathan ...... G06F 11/3676

2020/0185102 A1 * 6/2020 Leventhal ............. G06F 40/117
2020/0356678 A1 * 11/2020 Gourisetti ............. G06F 21/577
2021/0240597 A1 * 8/2021 Chen ................... G06F 11/3664

OTHER PUBLICATIONS

A. Ahmed, "Test automation for Graphical User Interfaces: A review," 2014 World Congress on Computer Applications and Information Systems (WCCAIS), Hammamet, Tunisia, 2014, pp. 1-6, doi: 10.1109/WCCAIS.2014.6916544. (Year: 2014).*
Wikipedia, "Jira (software)" https://en.wikipedia.org/w/index.php?title=Jira_(software)&oldid=1029305892, Jun. 19, 2021, 4 pages.
Wikipedia, "User Interface," https://en.wikipedia.org/w/index.php?title=User_interface&oldid=1031291510, Jun. 30, 2021, 14 pages.
Wikipedia, "Regression Testing," https://en.wikipedia.org/w/index.php?title=Regression_testing&oldid=1023075364, May 14, 2021, 4 pages.

* cited by examiner

*Primary Examiner* — Kieu D Vu
*Assistant Examiner* — Nicholas Hasty
(74) *Attorney, Agent, or Firm* — Ryan, Mason & Lewis, LLP

(57) ABSTRACT

A method comprises collecting data corresponding to operation of a user interface, analyzing the data and generating a dependency tree based at least in part on the analysis. The analyzing and the generating are performed using one or more machine learning techniques. The dependency tree comprises a plurality of nodes respectively corresponding to a plurality of components of the user interface and is organized at least in part according to one or more dependent relationships between the plurality of components. Based at least in part on a structure of the dependency tree, one or more test cases for the user interface are executed.

20 Claims, 9 Drawing Sheets

602

601

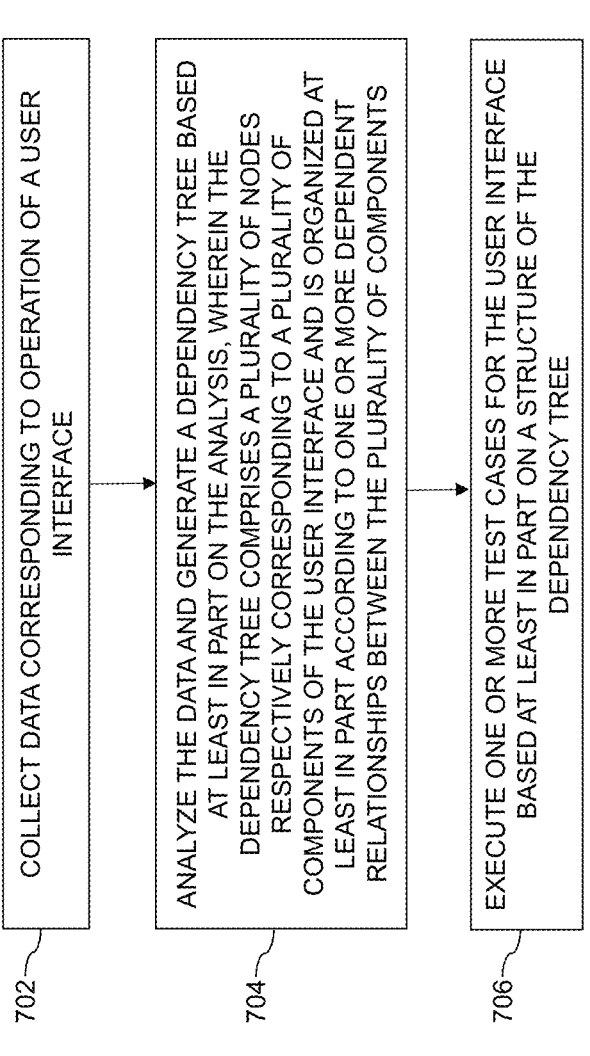

700

702 COLLECT DATA CORRESPONDING TO OPERATION OF A USER INTERFACE

704 ANALYZE THE DATA AND GENERATE A DEPENDENCY TREE BASED AT LEAST IN PART ON THE ANALYSIS, WHEREIN THE DEPENDENCY TREE COMPRISES A PLURALITY OF NODES RESPECTIVELY CORRESPONDING TO A PLURALITY OF COMPONENTS OF THE USER INTERFACE AND IS ORGANIZED AT LEAST IN PART ACCORDING TO ONE OR MORE DEPENDENT RELATIONSHIPS BETWEEN THE PLURALITY OF COMPONENTS

706 EXECUTE ONE OR MORE TEST CASES FOR THE USER INTERFACE BASED AT LEAST IN PART ON A STRUCTURE OF THE DEPENDENCY TREE

FIG. 7

USER INTERFACE MANAGEMENT FRAMEWORK

FIELD

The field relates generally to information processing systems, and more particularly to a framework for management of user interfaces.

BACKGROUND

Many applications provide options for users to select certain settings via a user interface. For example, an email or other application may include multiple checkboxes on a user interface where users can enable or disable different settings according to their preferences. Enablement or disablement of particular settings may also result in the enablement or disablement of additional settings which may be dependent on the particular settings. In some situations, the settings of dependent components may not coincide with the settings of the components from which they depend, causing problems for users.

SUMMARY

Embodiments provide a user interface management framework in an information processing system.

For example, in one embodiment, a method comprises collecting data corresponding to operation of a user interface, analyzing the data and generating a dependency tree based at least in part on the analysis. The analyzing and the generating are performed using one or more machine learning techniques. The dependency tree comprises a plurality of nodes respectively corresponding to a plurality of components of the user interface and is organized at least in part according to one or more dependent relationships between the plurality of components. Based at least in part on a structure of the dependency tree, one or more test cases for the user interface are executed.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 7 depicts a process for user interface management according to an illustrative embodiment.

DETAILED DESCRIPTION

Figure 1:
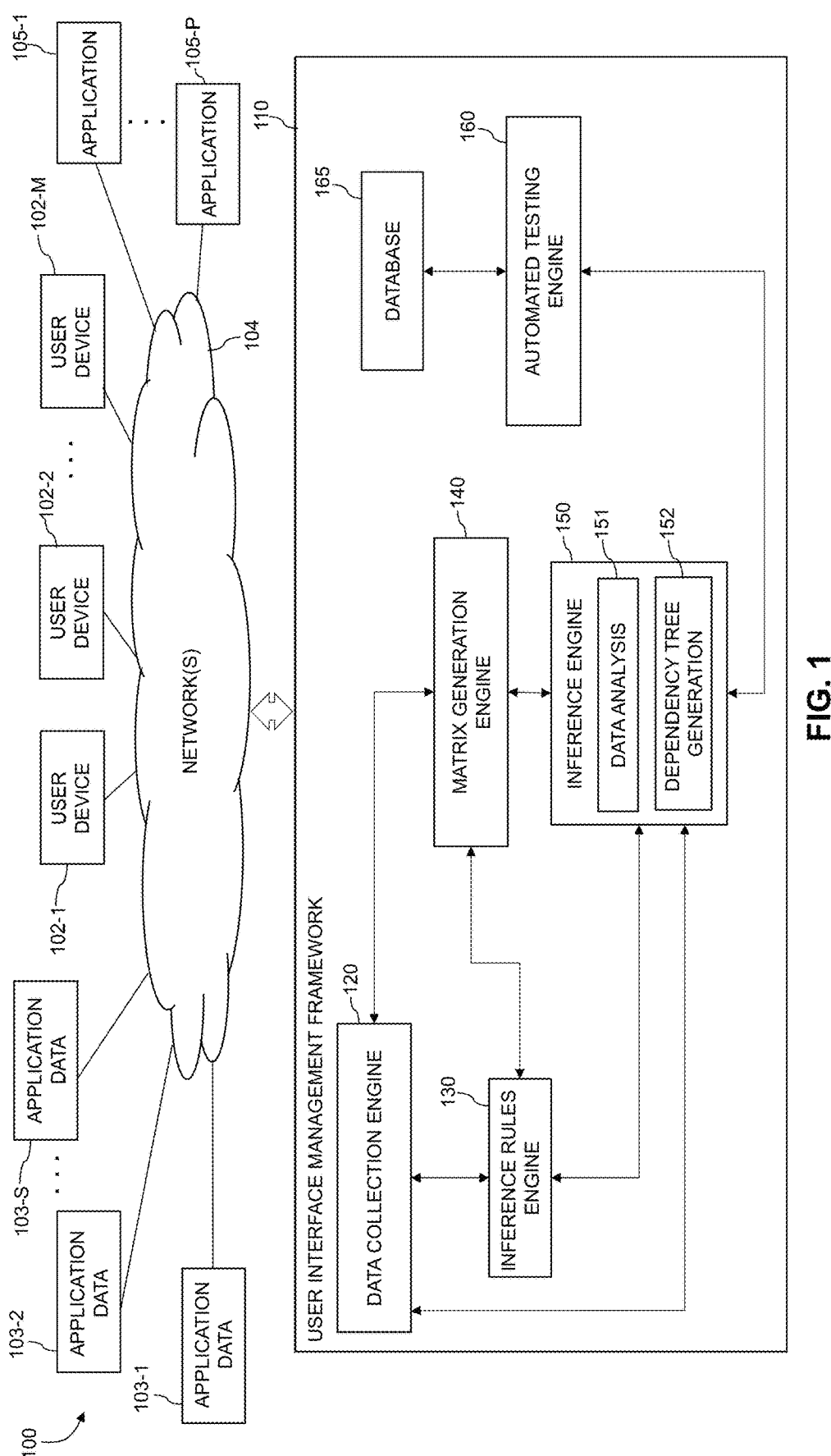
FIG. 1 depicts an information processing system with a user interface management framework in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, "application programming interface (API)" refers to a set of subroutine definitions, protocols, and/or tools for building software. Generally, an API defines communication between software components. APIs permit programmers to write software applications consistent with an operating environment or website.

As used herein, "natural language" is to be broadly construed to refer to any language that has evolved naturally in humans. Non-limiting examples of natural languages include, for example, English, Spanish, French and Hindi.

As used herein, "natural language processing (NLP)" is to be broadly construed to refer to interactions between computers and human (natural) languages, where computers are able to derive meaning from human or natural language input, and respond to requests and/or commands provided by a human using natural language.

FIG. 1 shows an information processing system 100 configured in accordance with an illustrative embodiment. The information processing system 100 comprises user devices 102-1, 102-2, . . . 102-M (collectively "user devices 102"). The user devices 102 communicate over a network 104 with a user interface management framework 110.

The user devices 102 can comprise, for example, Internet of Things (IoT) devices, desktop, laptop or tablet computers, mobile telephones, or other types of processing devices capable of communicating with the user interface management framework 110 over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable M and other similar index variables herein such as K, L, P and S are assumed to be arbitrary positive integers greater than or equal to two.

The terms "client" or "user" herein are intended to be broadly construed so as to encompass numerous arrangements of human, hardware, software or firmware entities, as well as combinations of such entities. User interface management services may be provided for users utilizing one or more machine learning models, although it is to be appreciated that other types of infrastructure arrangements could be used. At least a portion of the available services and functionalities provided by the user interface management framework 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the user interface management framework 110, as well as to support communication between the user interface management framework 110 and connected devices (e.g., user devices 102) and/or other related systems and devices not explicitly shown.

In some embodiments, the user devices 102 are assumed to be associated with repair technicians, system administrators, information technology (IT) managers, software developers release management personnel or other authorized personnel configured to access and utilize the user interface management framework 110.

The information processing system 100 further includes applications 105-1, . . . 105-P (collectively "applications 105") connected to the network 104 and accessible to the user devices 102 and to the user interface management framework 110 via the network 104. The applications comprise, for example, web-based or non-web-based applications, enterprise applications, utilities or other software which may be accessible to users on, for example, user devices 102. In some embodiments, the applications are hosted on one or more servers connected to the network 104 or may be downloaded to and/or running on the user devices 102. Some non-limiting examples of applications include, for example, technical support, email, storage management, device monitoring and/or commerce applications and/or other software which may include a user interface.

As used herein, a "user interface (UI)" is to be broadly construed to refer to, for example, an interactive space between a human user and a device, such as for example a user device 102, which enables the human user to operate and control the device and/or application or other software on the device, while the device and/or application or other software provides information to the user via the user interface. A non-limiting example of a user interface is a graphical user interface (GUI), which is a composite user interface, providing interaction with multiple senses of a user, such as, for example, sight (e.g., visual graphics), touch (tactile response) and/or hearing (sound output). As explained further herein, user interfaces provide selectable settings or features (also referred to herein as "components") based on, for example, the preferences of a user. Enablement (e.g., activation) or disablement (e.g., deactivation) of a given component may occur in response to an action by a user on the user interface such as, for example, checking or un-checking a box, bullet or other area adjacent the component, and/or selecting an option from a drop-down menu or other interactive mechanism to enable or disable the feature. Such checking, un-checking or other selection may be performed by a user via an input device such as a mouse or keyboard, via a touch on a touchscreen or by some other input mechanism to register the user's choice on the user interface. As noted herein, in some cases, one or more components (e.g., child components) may be dependent on other components (e.g., parent or primary components). For example, enabling a parent component may, in turn, enable one or more child (dependent) components or at least permit a user to activate or deactivate the one or more child components. Similarly, disabling a parent component may, in turn disable one or more child components or prevent a user from activating or deactivating the one or more child components.

Figures 6A, 6B:
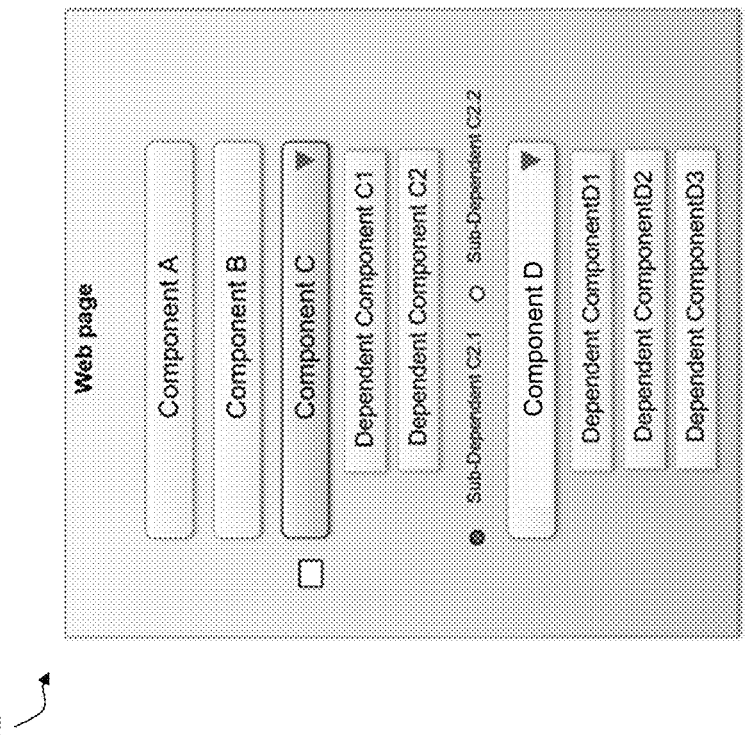
FIGS. 6A and 6B depict block diagrams of component dependencies that may appear on a user interface for an application in an illustrative embodiment.

FIGS. 6A and 6B depict block diagrams 601 and 602 of component dependencies that may appear on a user interface for an application 105. Referring to FIGS. 6A and 6B, there are 4 primary components A to D as shown in the block diagrams 601 and 602. The primary component C has two dependent components C1 and C2, and component C2, in turn, has two sub-dependent components C2.1 and C2.2. The dependent components C1 and C2 are dependent from the same component C and are siblings of each other. The sub-dependent components C2.1 and C2.2 are dependent from the same component C2 and are siblings of each other. The primary component D has three dependent components D1, D2 and D3. The dependent components D1, D2 and D3 are dependent from the same component D and are siblings of each other. In some embodiments, one component may require as an input, an output from another component. For example, the primary component D may require as an input, an output from component C.

As shown by the boxes and bullets in the block diagrams 601 and 602, in the user interface, there is an option to enable or disable components as per user preferences. For example, referring to the block diagram 601, when the component C is enabled (filled-in box), then its dependent components C1 and C2 are enabled for modification, thus creating a component-dependent relationship. In this case, sub-dependent component C2.1 has been enabled (filled-in bullet), but sub-dependent component C2.2 has not been enabled (vacant bullet). The primary components, the dependent components and the sibling components form a hierarchical structure.

Referring to the block diagram 602 in FIG. 6B, the component C is disabled as shown by the vacant box and darker shading. However, although component C is disabled, the dependent components C1 and C2 remain in an enabled state, and the selected sub-dependent component C2.1 remains selected. In addition, component D, which, according to an embodiment, requires an input from component C, also remains in the enabled state along with its dependent components D1, D2 and D3. Such an error may occur when there is a lack of rigorous automated regression testing based on user usage data and/or use case functionality. Such errors hinder user experiences and cause service dissatisfaction.

In a non-limiting operational example, there is an email settings component with an enable/disable checkbox. This component has as its dependent component a language selection dropdown menu to select a language in which emails are to be received. There is also an email notifications component dependent on the email settings component. The email notifications component is a sibling component to the language selection component. The email notifications component has a plurality of components dependent thereon that can be enabled or disabled as per a user's preferences. When the email settings component is enabled, then its dependent component for language selection is enabled for modification. Suppose a user selects Language A for email communications. As a result, the user starts receiving email notifications in Language A. In a scenario in which there is an issue with the user interface, after a certain time, the user disables the email settings component by unchecking the box. However, the user continues to receive email notifications in Language A rather than falling back to a default global language.

To address these and other issues, the embodiments provide a self-learning system to generate hierarchical, priority-based dependency trees of user interface components. The trees are generated using inputs comprising usage data of various users, data from user interface automation test cases, and defect and/or issue ticket data for different direct or transitive component dependencies.

Figure 2:
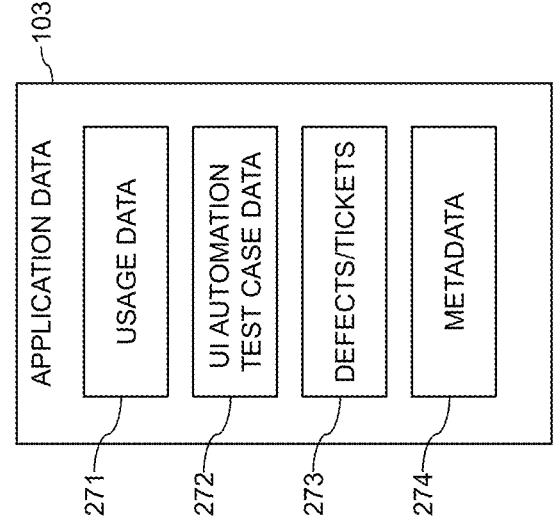
FIG. 2 depicts application data collected by the user interface management framework in an illustrative embodiment.

The information processing system 100 further includes application data sources 103-1, 103-2, . . . 103-S (collectively "application data 103") which comprise data used by the user interface management framework 110 in connection with the generation of component dependency trees. The application data is transmitted to the user interface management framework 110 via, for example, the network 104. Referring to FIG. 2, the application data 103 includes, but is not necessarily limited to, usage data 271, UI automation test case data 272, defects/tickets data 273 and metadata 274 associated with user interfaces of the applications 105.

For example, the usage data 271 comprises user-access patterns and recorded user activity in connection with user interfaces for a plurality of users. In more detail, the usage data 271 comprises video and/or image input (e.g., .jpg or .mp4 files) and/or statistical data detailing how users click through user interface pages, showing what components users have selected or unselected. The usage data 271 may also illustrate instances where a parent component is disabled (e.g., unchecked) but one or more child components are not restored to default values or, if the child is restored to default values, its sub-dependent components are not restored to default values. The usage data 271 can also comprise data detailing the click-through rates of users.

The UI automation test case data 272 comprises, for example, results of automated integration and/or unit testing of user interfaces for applications or other software. For example, automated testing of user interfaces may be performed based on simulated actions of a user disabling and/or enabling components of a user interface. The UI automation test case data 272 comprises the results and/or result analysis of the automated user interface testing.

The defects/tickets data 273 comprises, for example, tickets generated from an application or other software monitoring service outlining user interface issues and/or defects. For example, in a situation where a parent component has been disabled, but one or more child components have not been disabled and/or modified as a result of the disablement of the parent, the application monitoring service creates a ticket outlining the failure of the user interface and its corresponding application to appropriately change the status of its dependent components responsive to modification of a parent component. The defects/tickets data 273 comprises such tickets or other data outlining problems with a user interface.

The metadata 274 comprises, for example, timestamps of user actions and volume of clicks associated with usage data 271, and information identifying pages of a user interface and corresponding applications associated with the usage data 271, UI automation test case data 272 and/or defects/tickets data 273.

The user interface management framework 110 in the present embodiment is assumed to be accessible to the user devices 102 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The user interface management framework 110, on behalf of respective infrastructure tenants each corresponding to one or more users associated with respective ones of the user devices 102 provides a platform to utilize recursive-long short-term memory (R-LSTM) and Random Forest machine learning techniques to generate priority-based and/or weight-based use case decision trees. Advantageously, the user interface management framework 110 uses machine learning to generate dependency trees for different user interface components corresponding to multiple applications and/or webpages regardless of their underlying technology or browsers. The dependency trees are used in automated testing to solve problems associated with component dependencies in applications or other software.

Referring to FIG. 1, the user interface management framework 110 includes a data collection engine 120, an inference rules engine 130, a matrix generation engine 140, an inference engine 150, an automated testing engine 160 and a database 165. The inference engine 150 includes a data analysis layer 151 and a dependency tree generation layer 152.

The data collection engine 120 collects the application data 103 and provides the collected data to the inference rules and matrix generation engines 130 and 140. In one or more embodiments, the application data 103 (e.g., usage data 271, UI automation test case data 272 and/or metadata 274) is streamed or otherwise transmitted to the user interface management framework 110 from one or more user devices 102 on which a user is working with a user interface and/or on which UI automated testing is being performed. Additionally, the ticket/defect data 273 is streamed or otherwise transmitted to the user interface management framework 110 from one or more user devices 102 or other devices on which application tracking and/or monitoring software is being executed. The application tracking and/or monitoring software creates tickets or otherwise records information related to identified user interface defects and/or problems. In one or more embodiments, the application data 103 is pulled by the data collection engine 120 from the user devices 102 or other devices or databases comprising the application data 103. The data collection engine 120 may use one or more APIs to interface with the one or more user devices or other devices to retrieve the data 271-274.

Figure 3:
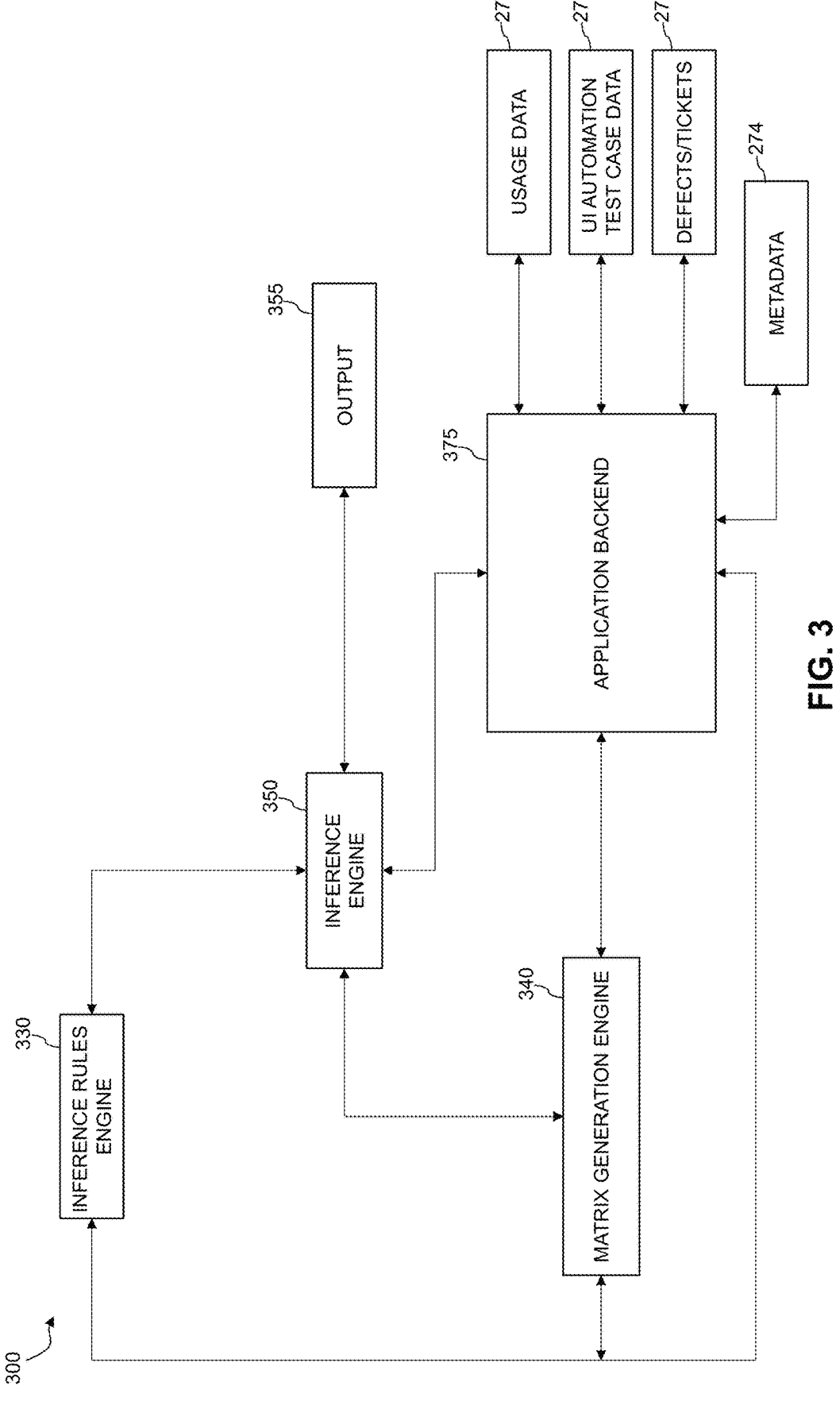
FIG. 3 depicts an operational flow detailing inputs to and an output from an inference engine in an illustrative embodiment.

Referring to the operational flow 300 in FIG. 3, an application backend 375 receives the usage data 271, UI automation test case data 272, defects/tickets data 273 and/or metadata 274. The application backend 375 provides the data inputs 271, 272, 273 and/or 274 via, for example, the data collection engine 120, to the inference rules engine 330 (which is the same or similar to the inference rules engine 130), the matrix generation engine 340 (which is the same or similar to the matrix generation engine 140) and to the inference engine 350 (which is the same or similar to the inference engine 150). For example, the application backend 375 provides inputs for each use case based on related user-access patterns and recorded usage data, user interface automation and tickets outlining user interface issues and/or defects.

Based on received UI automation test case data 272, the matrix generation engine 340/140 generates of a dependency weightage matrix from the inputs of each use case and their corresponding sub-test cases. In more detail, the matrix generation engine 340/140 generates a matrix comprising priorities between respective components of a user interface. For example, the matrix generation engine 140/340 generates a matrix prioritizing parent components over their dependent components. Additionally, in some embodiments, the respective components for which the priorities are assigned depend from the same component. In other words, the generated matrix further outlines priorities between sibling components based on, for example, determined importance and/or criticality of a given component relative to the remaining components. In some situations, a component may appear earlier in a user interface than another component of the user interface. However, the later appearing component may have a greater importance or criticality than the earlier appearing component, requiring that the later appearing component be prioritized higher. In addition, in some instances, an earlier appearing component on a user interface may depend from a later appearing on the user interface. The matrix generation engine 140/340 addresses these discrepancies.

The inference rules engine 130/330 includes and generates rules defined to calculate priority-based ranking of dependent and sibling components for each component use case. The inference rules engine 130/330 uses the UI automation test case data 272 and feedback from the inference engine 150/350 to generate new inference rules. Inference rules comprise, for example, definitions about behavior of a user interface in certain scenarios based on test case results. Such definitions can include rules about dependent and independent components and rules defining priorities between sibling components. The rules may also be derived from users performing certain actions identified in the usage data 271, and whether the actions conform to the UI automation test case data 272.

The inference engine 150/350, and more particularly, the data analysis layer 151 analyzes the UI automation test case data 272 with respect to the usage data 271 and the defects/tickets data 273 to identify similarities and differences, and the dependency tree generation layer 152 generates the dependency tree based on the analysis. In further detail, the inference engine 150/350 evaluates the rules and matrix inputs from the inference rules engine 130/330 and the matrix generation engine 140/340 to generate dependency trees for different user interfaces. The output 355 refers to the generated hierarchical priority/weightage-based tree with ranks of each component and their dependents and siblings. Additionally, the analysis results, including the generated dependency tree are fed back to the inference rules engine 130/330, and the inference rules engine 130/330 uses the feedback to modify current rules and/or generate new dependency and/or priority rules.

Figure 4:
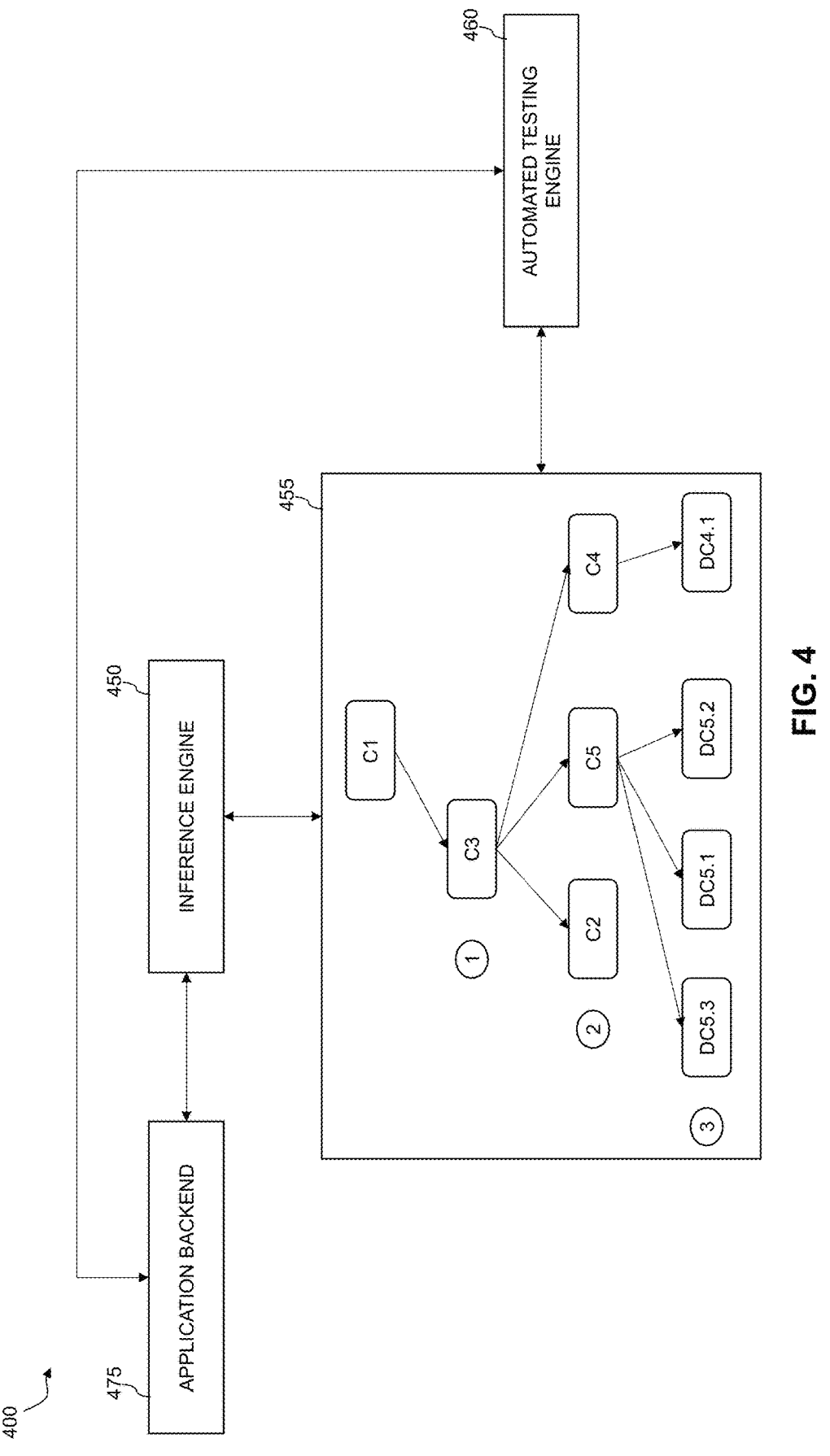
FIG. 4 depicts an operational flow for generation an application of a dependency tree in an illustrative embodiment.

Referring to the operational flow 400 in FIG. 4, an application backend 475 (which is the same or similar to the application backend 375) provides input to an inference engine 450 (which is the same or similar to the inference engine 150/350). The input comprises, for example, tickets or other information outlining user interface issues and/or defects (e.g., defects/tickets data 273), test case data (e.g., UI automation test case data 272) and/or user-access patterns and recorded usage data for a plurality of users (e.g., usage data 271). A dependency tree 455 is generated outlining the component relationships and dependencies. The lowest levels of selection of a value are the leaf nodes of the dependency tree 455. Here, the levels 1, 2 and 3 are dependent components. The inference engine 450 (or 150/350) creates the dependency tree 455 based on determined dependencies and infers a pattern for priority to be applied in the test cases executed by the automated testing engine 460 (which is the same or similar to the automated testing engine 460 (or 160). The automated testing engine 460 (or 160) performs the test cases based on the structure of the dependency tree 455, and updates use case checkpoints and the application backend 475 based on the results of the test cases.

In the dependency tree 455, a root/parent node is component C1, and component C3 is a child dependent node of C1. Components C2, C5 and C4 are child dependent components of component C3. Note here, that C3 is a parent of C2, which may be in opposition to the lexicographical order or view order of a user interface. However, the weightage of the component C3 as determined by, for example, the matrix generation engine 140/340, is greater than the weightage of the component C2 when compared to the parent node. Components DC5.3, DC5.1, DC5.2 and DC4.1 are dependent components/children of C5 and C4, respectively. Additionally, components C2, C5 and C4 are siblings of each other and appear in the same level in the tree. Note that, in a left-to-right scheme, sibling C5 is placed before sibling C4 in the tree, which may be in opposition to the lexicographical order or view order of the user interface. However, the weightage of component C5 as determined by, for example, the matrix generation engine 140/340, is greater than the weightage of the component C4 when compared to parent node C3.

The components DC5.3, DC5.1, DC5.2 and DC4.1 are labelled with D (dependent) to signify that these components are in the lowest level of the dependency tree 455, with no further components depending from these components or their siblings. However, it is to be understood that components C3, C2, C5 and C4 are also dependent components. Components DC5.3, DC5.1 and DC5.2 are siblings of each other and appear in the same level in the dependency tree 455. Note that, in a left-to-right scheme, sibling DC5.3 is placed before siblings DC5.1 and DC5.2 in the dependency tree 455, which may be in opposition to the lexicographical order or view order of the user interface. However, the weightage of component DC5.2 as determined by, for example, the matrix generation engine 140/340, is greater than the weightage of the components DC5.1 and DC5.2 when compared to parent node C5. The weightage of components DC5.3, DC5.1 and DC5.2 as determined by, for example, the matrix generation engine 140/340, is greater than the weightage of the component DC4.1, which may also be in opposition to the lexicographical order or view order of the user interface.

Figure 5:
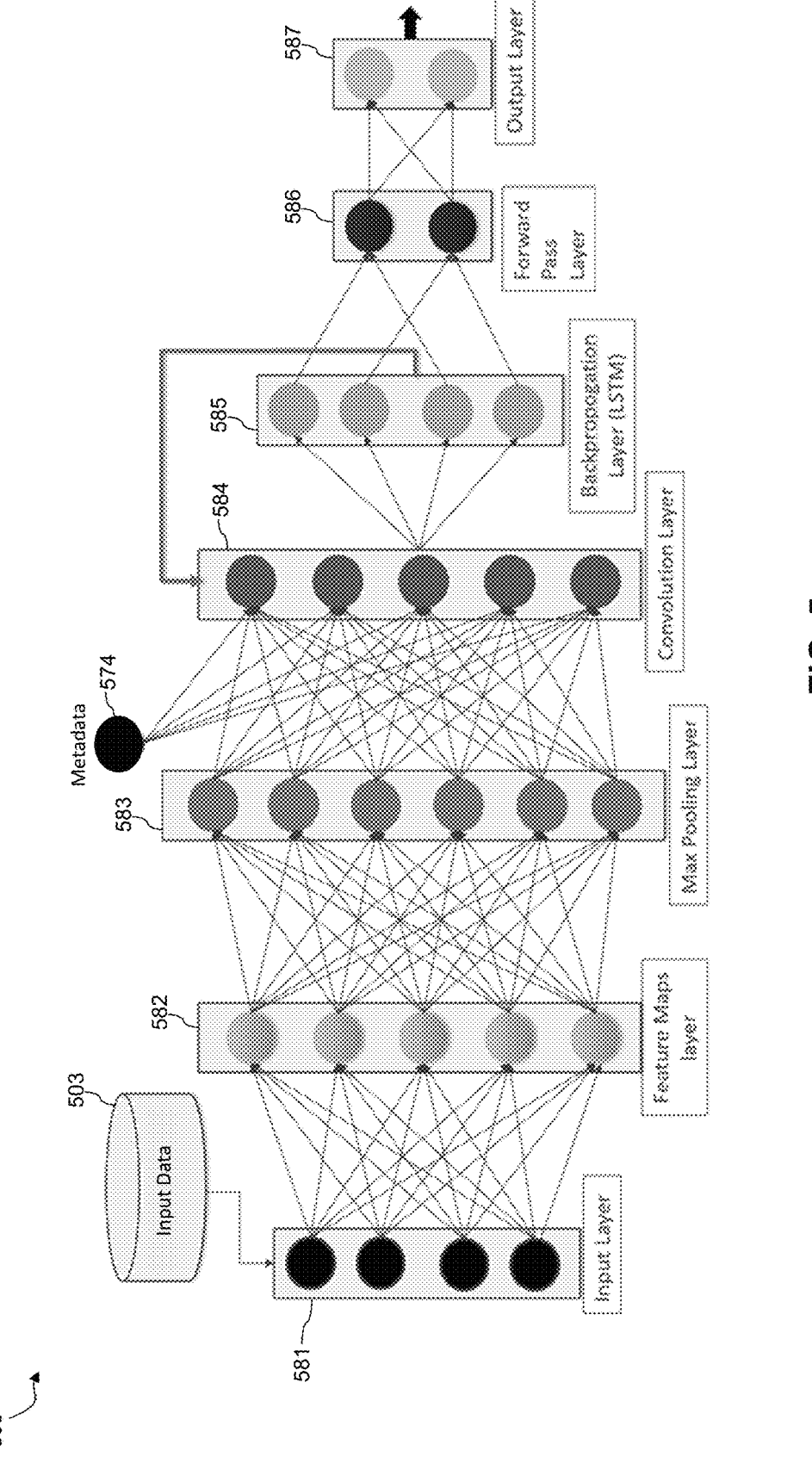
FIG. 5 depicts layers in a neural network in an illustrative embodiment.

Referring to the diagram of a neural network 500 in FIG. 5, an R-LSTM component in the network 500 is a branch of a recurrent neural network (RNN) used in deep learning, which presents a very large architecture that can be trained to extract patterns in an input feature space, where the input data spans over long sequences. With the gated architecture of the R-LSTM component, the network 500, learns the context required to make predictions in time series forecasting.

The network 500 comprises an input layer 581, a feature maps layer 582, a max pooling layer 583, a convolution layer 584, a backpropagation layer 585, a forward pass layer 586 and an output layer 587. The input layer 581 receives input data 503 comprising, for example, usage data 271, UI automation test case data 272 and/or defects/tickets data 273. The input layer 581 initializes the data and normalizes the data by converting the data to numerical data for analysis. Such normalization can be performed using, for example, NLU and/or NLP techniques. The feature maps layer 582 uses TensorFlow (TF) and weighting techniques to map user patterns from usage data 271, test cases from UI automation test case data 272, and defects/tickets data 273 to each other, according to, for example, the following: Weight(one_hot_vector(useCases))×TF.record(one_hot_vector(user_access_patterns).

The max pooling layer 583 performs map/reduce tasks to max pool files with higher values in the weight matrix generated by the matrix generation engine 140/340. The convolution layer 584 traces out nodes/use cases from a max pooled vector in the matrix that can be removed to accommodate incoming nodes according to slice information of nodes mapped with current priority and weightage requirements. The backpropagation layer 585 runs epochs to replace nodes of lower priority and accommodate new nodes with higher priority. For any use case miss, removed nodes are restored. The backpropagation layer 585 sends errors back to the convolution layer 584 to rerun the epoch. In other words, the backpropagation layer 585 recalculates priorities and/or weightage of the components of a generated dependency tree to determine how close the generated tree is to an actual dependency tree that should have been created. The backpropagation layer 585 sends errors back to the convolution layer 584, which regenerated the dependency tree based on the input from the backpropagation layer 585. The convolution layer 584 receives metadata 574 (which is the same or similar to the metadata 274), which the convolution layer uses to generate the dependency tree. The backpropagation layer 585 is leveraged for any user interface page to diagnose and fix problems associated with the priority of test cases. The forward pass layer 586 creates links between the nodes of the dependency tree and saves the tree as a checkpoint in a machine learning model. The output layer 587 creates new checkpoints and clears task resources.

According to one or more embodiments, an RNN technique is combined with a multiple decision tree classifier to generate the dependency trees as described herein. More specifically, an R-LSTM implementation is combined with a Random Forest implementation to generate the dependency trees. In one or more embodiments, the R-LSTM techniques are used to determine dependency relationships between components (e.g., parent and child components) and the Random Forest techniques are used to determine locations of the components on the dependency trees (e.g., priority between components on the same level.

In one or more embodiments, recorded telemetry data comprising support service tickets and/or defects (e.g., data 273), user interface or backend test case data (e.g., data 272) and/or user-access pattern and user journey data (e.g., data 271) is provided to user interface management framework 110. The data 271, 272 and/or 273 collected by the data collection engine 120 is used to train the one or more machine learning models that may be used to generate the dependency trees. The user interface management framework 110 analyzes and generates tree patterns based on the weightage or priority of use cases mapped in generated matrices, which are used for automation testing by the automated testing engine 160. In one or more embodiments, a confidence value is computed for the generated dependency tree, and the dependency tree is stored in a memory (e.g., in a database 165) using checkpoints responsive the confidence value exceeding a threshold (e.g., 99.99%).

According to one or more embodiments, the database 165 and other databases utilized in connection with the embodiments can be configured according to a relational database management system (RDBMS) (e.g., PostgreSQL). In some embodiments, the database 165 and other databases utilized in connection with the embodiments is implemented using one or more storage systems or devices associated with the user interface management framework 110. In some embodiments, one or more of the storage systems utilized to implement the database 165 and other databases utilized in connection with the embodiments comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the user interface management framework 110, the data collection engine 120, inference rules engine 130, matrix generation engine 140, inference engine 150, automated testing engine 160 and/or database 165 in other embodiments can be implemented at least in part externally to the user interface management framework 110, for example, as stand-alone servers, sets of servers or other types of systems coupled to the network 104. For example, the data collection engine 120, inference rules engine 130, matrix generation engine 140, inference engine 150, automated testing engine 160 and/or database 165 may be provided as cloud services accessible by the user interface management framework 110.

The data collection engine 120, inference rules engine 130, matrix generation engine 140, inference engine 150, automated testing engine 160 and/or database 165 in the FIG. 1 embodiment are each assumed to be implemented using at least one processing device. Each such processing device generally comprises at least one processor and an associated memory, and implements one or more functional modules for controlling certain features of the data collection engine 120, inference rules engine 130, matrix generation engine 140, inference engine 150, automated testing engine 160 and/or database 165.

At least portions of the user interface management framework 110 and the elements thereof may be implemented at least in part in the form of software that is stored in memory and executed by a processor. The user interface management framework 110 and the elements thereof comprise further hardware and software required for running the user interface management framework 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the data collection engine 120, inference rules engine 130, matrix generation engine 140, inference engine 150, automated testing engine 160, database 165 and other elements of the user interface management framework 110 in the present embodiment are shown as part of the user interface management framework 110, at least a portion of the data collection engine 120, inference rules engine 130, matrix generation engine 140, inference engine 150, automated testing engine 160, database 165 and other elements of the user interface management framework 110 in other embodiments may be implemented on one or more other processing platforms that are accessible to the user interface management framework 110 over one or more networks. Such elements can each be implemented at least in part within another system element or at least in part utilizing one or more stand-alone elements coupled to the network 104.

It is assumed that the user interface management framework 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the data collection engine 120, inference rules engine 130, matrix generation engine 140, inference engine 150, automated testing engine 160, database 165 and other elements of the user interface management framework 110, and the elements thereof can each be implemented in the form of one or more LXCs running on one or more VMs. Other arrangements of one or more processing devices of a processing platform can be used to implement the data collection engine 120, inference rules engine 130, matrix generation engine 140, inference engine 150, automated testing engine 160 and database 165, as well as other elements of the user interface management framework 110. Other portions of the system 100 can similarly be implemented using one or more processing devices of at least one processing platform.

Distributed implementations of the system 100 are possible, in which certain elements of the system reside in one data center in a first geographic location while other elements of the system reside in one or more other data centers in one or more other geographic locations that are potentially remote from the first geographic location. Thus, it is possible in some implementations of the system 100 for different portions of the user interface management framework 110 to reside in different data centers. Numerous other distributed implementations of the user interface management framework 110 are possible.

Accordingly, one or each of the data collection engine 120, inference rules engine 130, matrix generation engine 140, inference engine 150, automated testing engine 160, database 165 and other elements of the user interface management framework 110 can each be implemented in a distributed manner so as to comprise a plurality of distributed elements implemented on respective ones of a plurality of compute nodes of the user interface management framework 110.

It is to be appreciated that these and other features of illustrative embodiments are presented by way of example only, and should not be construed as limiting in any way.

Accordingly, different numbers, types and arrangements of system elements such as the data collection engine 120, inference rules engine 130, matrix generation engine 140, inference engine 150, automated testing engine 160, database 165 and other elements of the user interface management framework 110, and the portions thereof can be used in other embodiments.

It should be understood that the particular sets of modules and other elements implemented in the system 100 as illustrated in FIG. 1 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the user interface management framework can be offered to cloud infrastructure customers or other users as part of FaaS, CaaS and/or PaaS offerings.

The operation of the information processing system 100 will now be described in further detail with reference to the flow diagram of FIG. 7. With reference to FIG. 7, a process 700 for user interface management as shown includes steps 702 through 706, and is suitable for use in the system 100 but is more generally applicable to other types of information processing systems comprising a user interface management framework configured for managing user interfaces.

In step 702, data corresponding to operation of a user interface is collected. The data comprises user interface usage data of one or more users, test case data for the user interface and/or information about one or more issues with the user interface. The user interface usage data comprises one or more results of a user enabling and/or disabling one or more of the plurality of components via the user interface. The test case data for the user interface comprises one or more results of automated unit and/or automated integration tests of the user interface. The information about one or more issues with the user interface comprises one or more issue tickets created in response to a lack of dependent operation between at least two components of the plurality of components having a dependent relationship.

In step 704, the data is analyzed and a dependency tree based at least in part on the analysis is generated. The analyzing and the generating are performed using one or more machine learning techniques comprising, for example, a Random Forest algorithm combined with the R-LSTM algorithm. The dependency tree comprises a plurality of nodes respectively corresponding to a plurality of components of the user interface and is organized at least in part according to one or more dependent relationships between the plurality of components. In step 706, one or more test cases for the user interface are executed based at least in part on a structure of the dependency tree.

The plurality of components respectively correspond to features of an application which can be enabled and/or disabled responsive to one or more actions performed via the user interface. A dependent relationship found on the dependency tree comprises a first component and at least a second component dependent on the first component, wherein the second component is enabled or disabled based on whether the first component is enabled or disabled.

According to an embodiment, the dependency tree is further organized at least in part according to one or more priorities between respective components of the plurality of components, wherein the respective components depend from the same component of the plurality of components. A matrix comprising the one or more priorities between the respective components is generated from test case data for the user interface. A plurality of rules corresponding to the one or more dependent relationships between the plurality of components is generated from the test case data. The generation of the plurality of rules is based at least in part on the structure of the dependency tree. In one or more embodiments, a confidence value for the dependency tree is computed, and the dependency tree is stored in a database responsive the confidence value exceeding a threshold.

It is to be appreciated that the FIG. 7 process and other features and functionality described above can be adapted for use with other types of information systems configured to execute user interface management services in a user interface management framework or other type of platform.

The particular processing operations and other system functionality described in conjunction with the flow diagram of FIG. 7 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 7 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a user interface management framework as disclosed herein can provide a number of significant advantages relative to conventional arrangements. For example, the user interface management framework reduces implementation complexity by, for example, removing input sequence dependence among the input variables. Under current approaches, user interface testing is performed in a predetermined sequence, which must be repeated as new test cases are developed. By relying on the priorities of generated dependency trees, test cases need not be performed in order, and may be performed in any sequence reflecting different orders of input variables.

The embodiments advantageously provide techniques to infer real-time dependency trees for different user interface components associated with multiple applications and/or webpages independent of the underlying technology or browser. Unlike current approaches, the embodiments combine R-LSTM and Random Forest machine learning techniques to generate priority-based and/or weight-based dependency trees for user interface components. Moreover, the embodiments automatically re-prioritize the test cases based upon the direct and transcendent dependencies of user interface components.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the user interface management framework 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a user interface management framework in illustrative embodiments. These and other cloud-based systems in illustrative embodiments can include object stores.

Illustrative embodiments of processing platforms will now be described in greater detail with reference to FIGS. 8 and 9. Although described in the context of system 100, these platforms may also be used to implement at least portions of other information processing systems in other embodiments.

Figure 8:
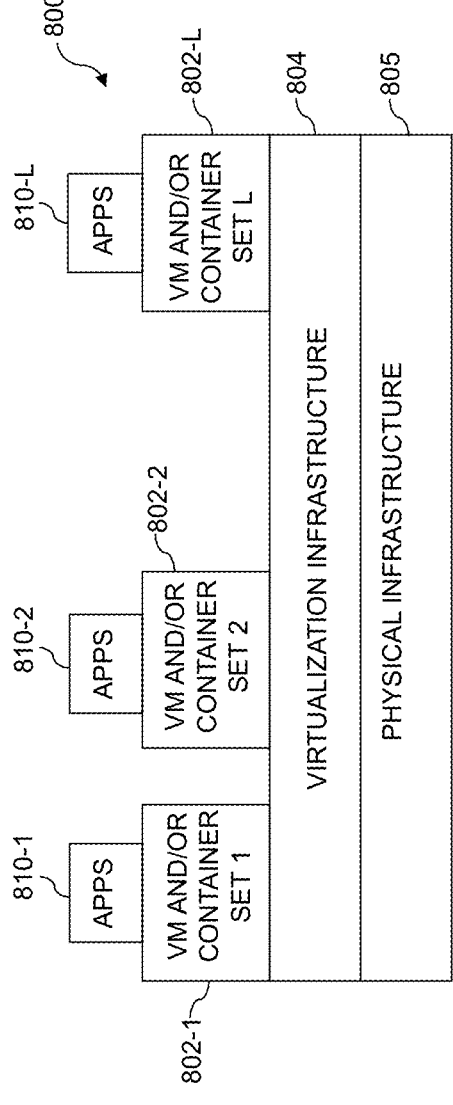
FIGS. 8 and 9 show examples of processing platforms that may be utilized to implement at least a portion of an information processing system according to illustrative embodiments.
Figure 9:
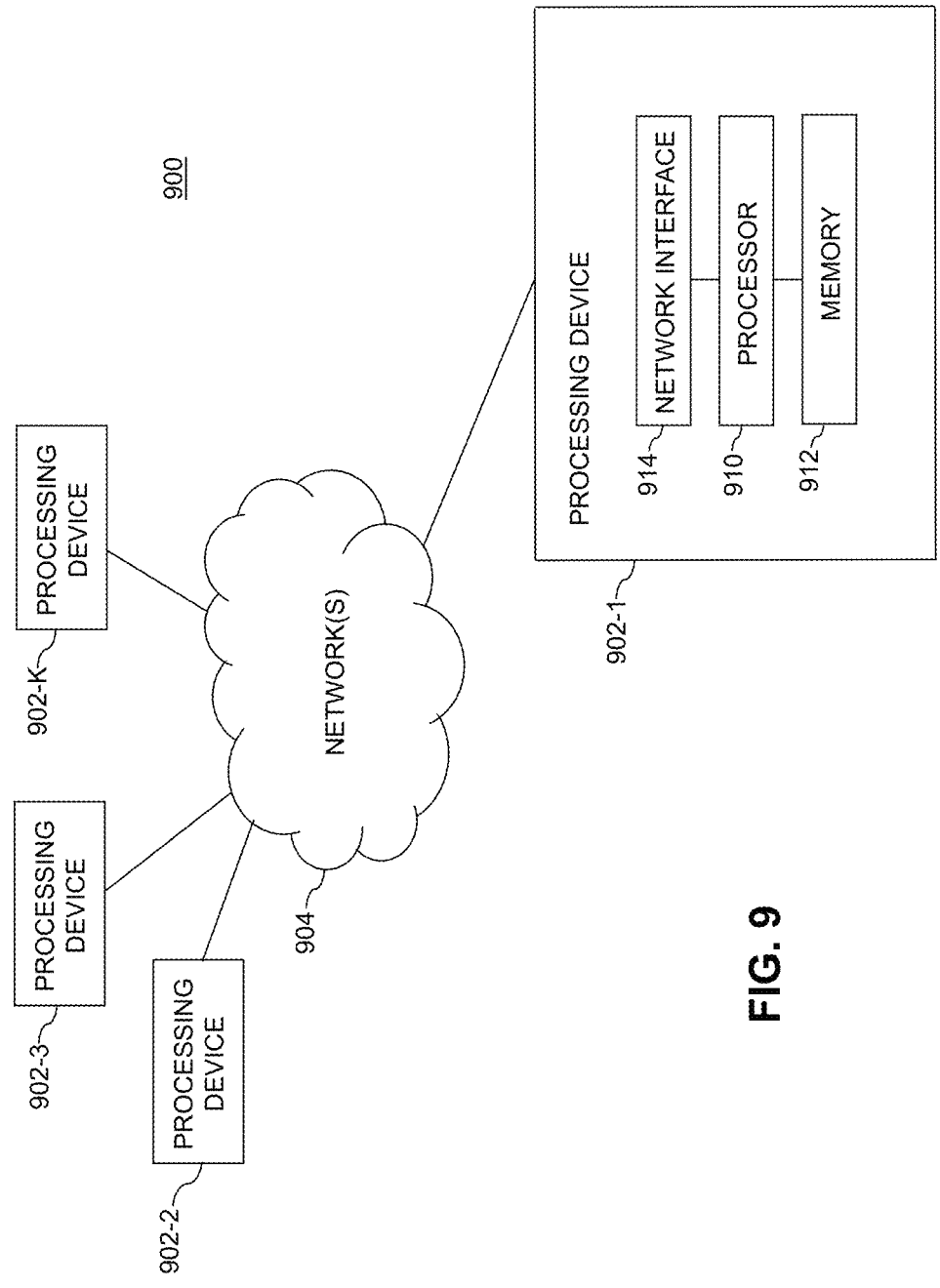

FIG. 8 shows an example processing platform comprising cloud infrastructure 800. The cloud infrastructure 800 comprises a combination of physical and virtual processing resources that may be utilized to implement at least a portion of the information processing system 100. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. A hypervisor platform may be used to implement a hypervisor within the virtualization infrastructure 804, where the hypervisor platform has an associated virtual infrastructure management system. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912. The processor 910 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 912 may comprise random access memory (RAM), read-only memory (ROM), flash memory or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the user interface management framework 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and user interface management frameworks. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

collecting data associated with operation of a user interface;

generating, using a first machine learning model, a weightage matrix comprising at least one or more dependent relationships between a plurality of components of the user interface based on the collected data;

generating, using a second machine learning model, a plurality of rules corresponding to the one or more dependent relationships between the plurality of components of the user interface based on the collected data;

analyzing the weightage matrix and the plurality of rules and generating a dependency tree, using a third machine learning model, based at least in part on the analysis of the weightage matrix and the plurality of rules corresponding to the one or more dependent relationships between the plurality of components of the user interface based on the collected data, wherein the dependency tree comprises a plurality of nodes respectively corresponding to the plurality of components of the user interface and is organized at least in part according to the one or more dependent relationships between the plurality of components;

inferring, using the third machine learning model, a priority to be applied in executing one or more test cases for the user interface based at least in part on a structure of the dependency tree;

executing the one or more test cases for the user interface based at least in part on the inferred priority and collecting updated data associated with the operation of the user interface as a result of the execution of the one or more test cases;

iteratively inputting the analysis of the third machine learning model, including the generated dependency tree and the priority to be applied in executing the one or more test cases, and the updated data associated with the operation of the user interface into the second machine learning model to at least one of modify the plurality of rules and generate a plurality of new rules; and iteratively executing one or more additional test cases for the user interface based on one of the modified plurality of rules and the generated plurality of new rules and collecting additional updated data associated with the operation of the user interface as a result of the execution of the one or more additional test cases;

wherein the steps of the method are executed by a processing device operatively coupled to a memory.

2. The method of claim 1, wherein the data comprises at least one of user interface usage data of one or more users, test case data for the user interface and information about one or more issues with the user interface.

3. The method of claim 2, wherein the user interface usage data comprises one or more results of a user at least one of enabling and disabling one or more of the plurality of components via the user interface.

4. The method of claim 2, wherein the test case data for the user interface comprises one or more results of at least one of automated unit and automated integration tests of the user interface.

5. The method of claim 2, wherein the information about one or more issues with the user interface comprises one or more issue tickets created in response to a lack of dependent operation between at least two components of the plurality of components having a dependent relationship.

6. The method of claim 1, wherein the plurality of components respectively correspond to features of an application which can be at least one of enabled and disabled responsive to one or more actions performed via the user interface.

7. The method of claim 6, wherein a dependent relationship of the one or more dependent relationships of the dependency tree comprises a first component and at least a second component dependent on the first component, wherein the second component is one of enabled and disabled based on whether the first component is one of enabled and disabled.

8. The method of claim 1, wherein the third machine learning model comprises a recursive-long short-term memory algorithm.

9. The method of claim 8, wherein the third machine learning model further comprise a Random Forest algorithm combined with the recursive-long short-term memory algorithm.

10. The method of claim 1, wherein the dependency tree is further organized at least in part according to one or more priorities between respective components of the plurality of components, wherein the respective components depend from the same component of the plurality of components.

11. The method of claim 10, the weightage matrix further comprising the one or more priorities between the respective components.

12. The method of claim 11, wherein the data comprises test case data for the user interface and the weightage matrix is generated from the test case data.

13. The method of claim 1, wherein the data comprises test case data for the user interface and the plurality of rules are generated from the test case data.

14. The method of claim 1, wherein the generation of the plurality of new rules is based at least in part on the structure of the dependency tree.

15. The method of claim 1, further comprising:

computing a confidence value for the dependency tree; and storing the dependency tree in a database responsive to the confidence value exceeding a threshold.

16. An apparatus comprising:

a processing device operatively coupled to a memory and configured to:

collect data associated with operation of a user interface;

generate, using a first machine learning model, a weightage matrix comprising at least one or more dependent relationships between a plurality of components of the user interface based on the collected data;

generate, using a second machine learning model, a plurality of rules corresponding to the one or more dependent relationships between the plurality of components of the user interface based on the collected data;

analyze the weightage matrix and the plurality of rules and generate a dependency tree, using a third machine learning model, based at least in part on the analysis of the weightage matrix and the plurality of rules corresponding to the one or more dependent relationships between the plurality of components of the user interface based on the collected data, wherein the dependency tree comprises a plurality of nodes respectively corresponding to the plurality of components of the user interface and is organized at least in part according to the one or more dependent relationships between the plurality of components; and infer, using the third machine learning model, a priority to be applied in executing one or more test cases for the user interface based at least in part on a structure of the dependency tree;

execute the one or more test cases for the user interface based at least in part on the inferred priority and collecting updated data associated with the operation of the user interface as a result of the execution of the one or more test cases;

iteratively input the analysis of the third machine learning model, including the generated dependency tree and the priority to be applied in executing the one or more test cases, and the updated data associated with the operation of the user interface into the second machine learning model to at least one of modify the plurality of rules and generate a plurality of new rules; and iteratively execute one or more additional test cases for the user interface based on one of the modified plurality of rules and the generated plurality of new rules and collecting additional updated data associated with the operation of the user interface as a result of the execution of the one or more additional test cases.

17. The apparatus of claim 16, wherein the plurality of components respectively correspond to features of an application which can be one of enabled and disabled responsive to one or more actions performed via the user interface.

18. An article of manufacture comprising a non-transitory processor-readable storage medium having stored therein program code of one or more software programs, wherein the program code when executed by at least one processing device causes said at least one processing device to perform the steps of:

collecting data associated with operation of a user interface;

generating, using a first machine learning model, a weightage matrix comprising at least one or more dependent relationships between a plurality of components of the user interface based on the collected data;

generating, using a second machine learning model, a plurality of rules corresponding to the one or more dependent relationships between the plurality of components of the user interface based on the collected data;

analyzing the weightage matrix and the plurality of rules and generating a dependency tree, using a third machine learning model, based at least in part on the analysis of the weightage matrix and the plurality of rules corresponding to the one or more dependent relationships between the plurality of components of the user interface based on the collected data, wherein the dependency tree comprises a plurality of nodes respectively corresponding to the plurality of components of the user interface and is organized at least in part according to the one or more dependent relationships between the plurality of components;

inferring, using the third machine learning model, a priority to be applied in executing one or more test cases for the user interface based at least in part on a structure of the dependency tree;

executing the one or more test cases for the user interface based at least in part on the inferred priority and collecting updated data associated with the operation of the user interface as a result of the execution of the one or more test cases;

iteratively inputting the analysis of the third machine learning model, including the generated dependency tree and the priority to be applied in executing the one or more test cases, and the updated data associated with the operation of the user interface into the second machine learning model to at least one of modify the plurality of rules and generate a plurality of new rules; and iteratively executing one or more additional test cases for the user interface based on one of the modified plurality of rules and the generated plurality of new rules and collecting additional updated data associated with the operation of the user interface as a result of the execution of the one or more additional test cases.

19. The article of manufacture of claim 18, wherein the plurality of components respectively correspond to features of an application which can be one of enabled and disabled responsive to one or more actions performed via the user interface.

20. The apparatus of claim 16, wherein the data comprises at least one of user interface usage data of one or more users, test case data for the user interface and information about one or more issues with the user interface.

* * * * *